United States Patent
Radulescu et al.

(10) Patent No.: US 12,335,173 B2
(45) Date of Patent: Jun. 17, 2025

(54) PHYSICAL ENTITY PROFILES OF A RADIO UNIT

(71) Applicant: QUALCOMM Incorporated, San Diego, CA (US)

(72) Inventors: Andrei Dragos Radulescu, La Jolla, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 17/650,486

(22) Filed: Feb. 9, 2022

(65) Prior Publication Data

US 2022/0255688 A1      Aug. 11, 2022

Related U.S. Application Data

(60) Provisional application No. 63/147,970, filed on Feb. 10, 2021.

(51) Int. Cl.
*H04L 5/00*          (2006.01)
(52) U.S. Cl.
CPC ............ *H04L 5/0032* (2013.01); *H04L 5/001* (2013.01)
(58) Field of Classification Search
CPC ... H04L 5/0032; H04L 5/001; H04L 27/2601; H04W 24/02; H04W 88/085
See application file for complete search history.

(56) References Cited

U.S. PATENT DOCUMENTS

| | | | |
|---|---|---|---|
| 11,689,977 B2 * | 6/2023 | Sharma | H04W 36/0061 370/331 |
| 2010/0111013 A1 | 5/2010 | Chou | |
| 2012/0201315 A1 * | 8/2012 | Zhang | H04L 1/08 375/299 |
| 2019/0166651 A1 | 5/2019 | Ode et al. | |
| 2021/0204144 A1 * | 7/2021 | Okuyama | H04B 7/0413 |

OTHER PUBLICATIONS

International Search Report and Written Opinion—PCT/US2022/070601—ISA/EPO—May 11, 2022.

* cited by examiner

*Primary Examiner* — Kabir A Timory
(74) *Attorney, Agent, or Firm* — Paul M. McAdams; Harrity & Harrity, LLP

(57) ABSTRACT

Various aspects of the present disclosure generally relate to wireless communication. In some aspects, a base station may provide, to a distributed unit (DU) of the base station, an indication of one or more candidate physical entity (PHY) profiles. The base station may receive, from the DU, an indication of a selected PHY profile, of the one or more candidate PHY profiles, to use for communication with a device, such as a user equipment. Numerous other aspects are described.

30 Claims, 8 Drawing Sheets

PHYSICAL ENTITY PROFILES OF A RADIO UNIT

CROSS-REFERENCE TO RELATED APPLICATION

This Patent Application claims priority to U.S. Provisional Patent Application No. 63/147,970, filed on Feb. 10, 2021, entitled "PHYSICAL ENTITY PROFILES OF A RADIO UNIT," and assigned to the assignee hereof. The disclosure of this prior Provisional Application is considered part of and is incorporated by reference into this Patent Application in its entirety.

FIELD OF THE DISCLOSURE

Aspects of the present disclosure generally relate to wireless communication and to techniques and apparatuses for physical entity profiles of a radio unit.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes providing, by a radio unit (RU) of the base station and to a distributed unit (DU) of the base station, an indication of one or more candidate physical entity (PHY) profiles; and receiving, by the RU and from the DU, an indication of a selected PHY profile, of the one or more candidate PHY profiles, to use for communication with a device.

In some aspects, a base station for wireless communication includes a memory; and one or more processors coupled to the memory, the one or more processors configured to: provide, to a DU of the base station, an indication of one or more candidate PHY profiles; and receive, from the DU, an indication of a selected PHY profile, of the one or more candidate PHY profiles, to use for communication with a device.

In some aspects, a non-transitory computer-readable medium storing a set of instructions for wireless communication includes one or more instructions that, when executed by one or more processors of a base station, cause the base station to: provide, to a DU of the base station, an indication of one or more candidate PHY profiles; and receive, from the DU, an indication of a selected PHY profile, of the one or more candidate PHY profiles, to use for communication with a device.

In some aspects, an apparatus for wireless communication includes means for providing, to a DU of the apparatus, an indication of one or more candidate PHY profiles; and means for receiving, from the DU, an indication of a selected PHY profile, of the one or more candidate PHY profiles, to use for communication with a device.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). Aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems are presented herein with reference to various apparatuses and techniques. These apparatuses and techniques are described herein and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
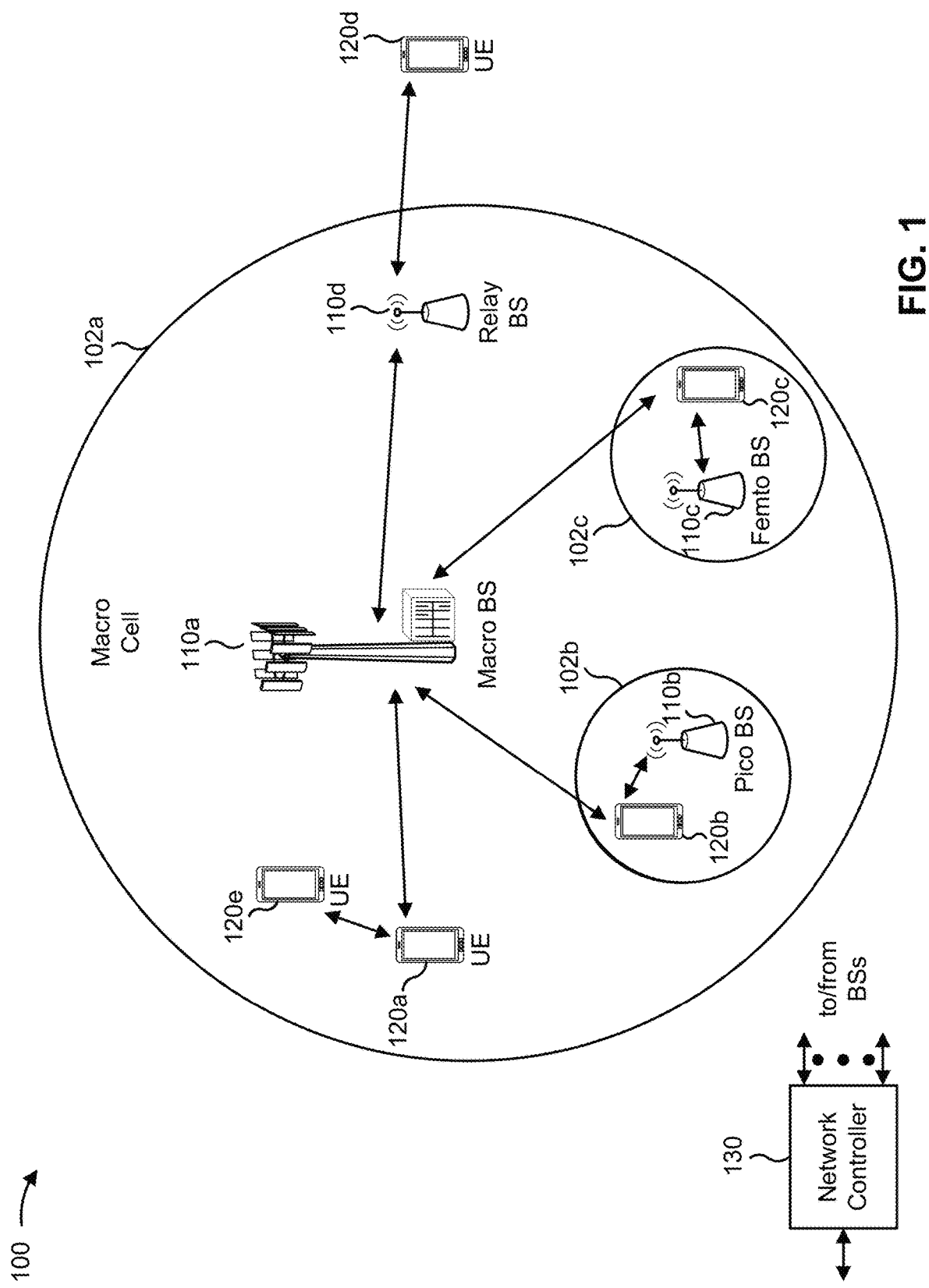
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
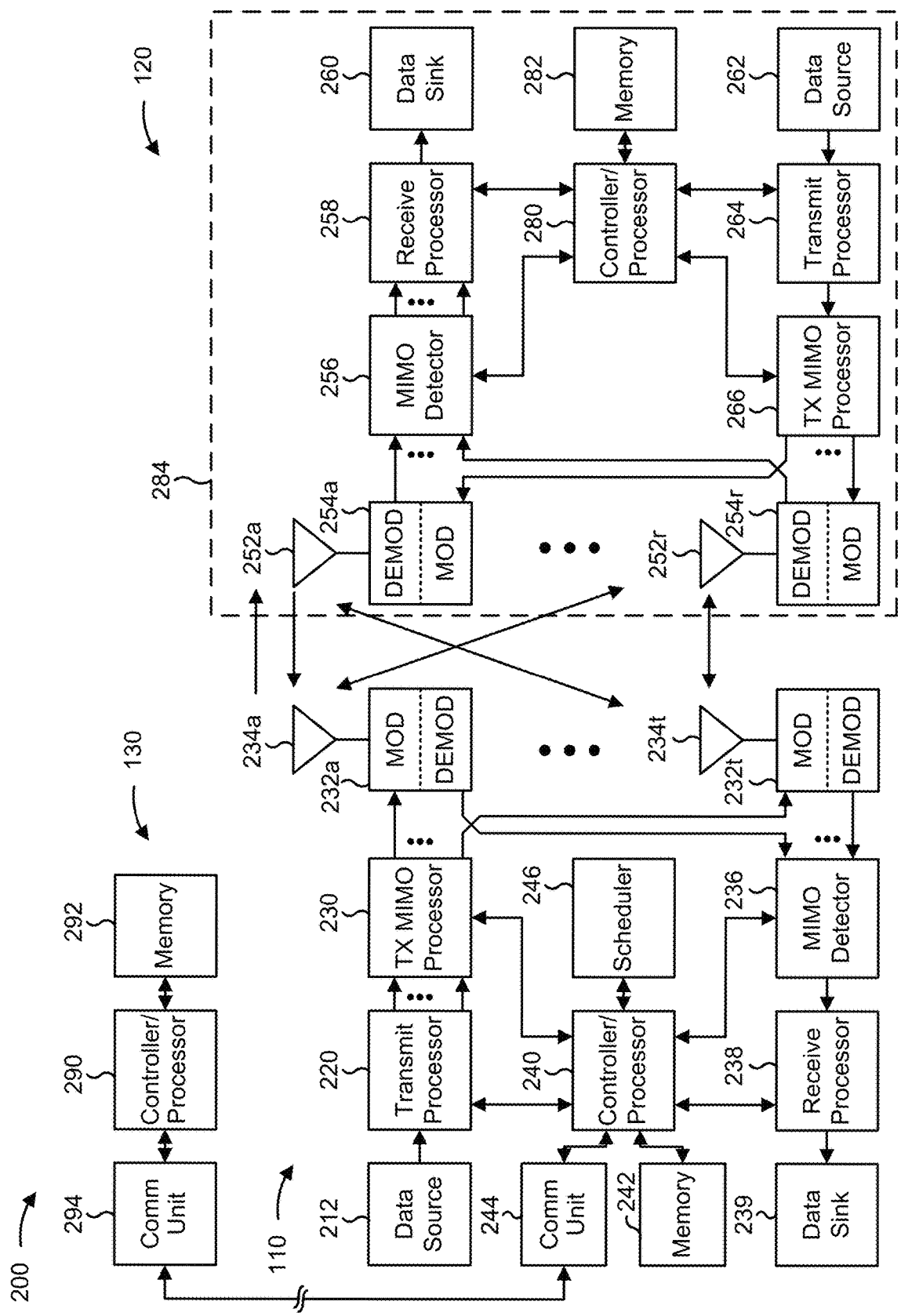
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-8).

Controller/processor 240 of base station 110, controller/processor 280 of UE 120, and/or any other component(s) of FIG. 2 may perform one or more techniques associated with PHY profiles of a radio unit, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the base station includes means for providing, by an RU of the base station and to a DU of the base station, an indication of one or more candidate PHY profiles; or means for receiving, by the RU and from the DU, an indication of a selected PHY profile, of the one or more candidate PHY profiles, to use for communication with a device. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for providing, by the RU and to the DU, an indication that the selected PHY profile is incompatible with a selected front end unit (FEU) profile.

In some aspects, the base station includes means for providing, by the RU and to the DU, an indication of one or more recommended PHY profiles, of the one or more candidate PHY profiles, or means for providing, by the RU and to the DU, an indication of one or more recommended FEU profiles that are compatible with the selected PHY profile.

In some aspects, the base station includes means for providing, by the RU and to the DU, an indication of one or more compatible pairs of PHY profiles and FEU profiles that match an intended FEU profile.

In some aspects, the base station includes means for providing a mapping of FEU profiles to compatible PHY profiles.

In some aspects, the base station includes means for receiving, by the RU and from the DU, an indication of a set of parameters for selection of one or more of a candidate PHY profile or a candidate FEU profile; or means for providing, by the RU and to the DU, an indication of one or more recommended PHY profiles, of the one or more candidate PHY profiles, or one or more recommended FEU profiles based at least in part on the set of parameters, wherein reception of the indication of the selected PHY profile is based at least in part on the indication of the one or more recommended PHY profiles.

In some aspects, the base station includes means for providing a set of PHY profiles that satisfy the set of parameters, means for providing a set of PHY profiles that satisfy a subset of the set of parameters, or an indication that the set of parameters is rejected.

In some aspects, the base station includes means for receiving, by the RU and from the DU, a request for partition subset capabilities; or means for providing, by the RU and to the DU, an indication of partition subset capabilities.

In some aspects, the base station includes means for providing an indication of a dependency of the partition subset capabilities on a selection of a PHY profile or a FEU profile.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
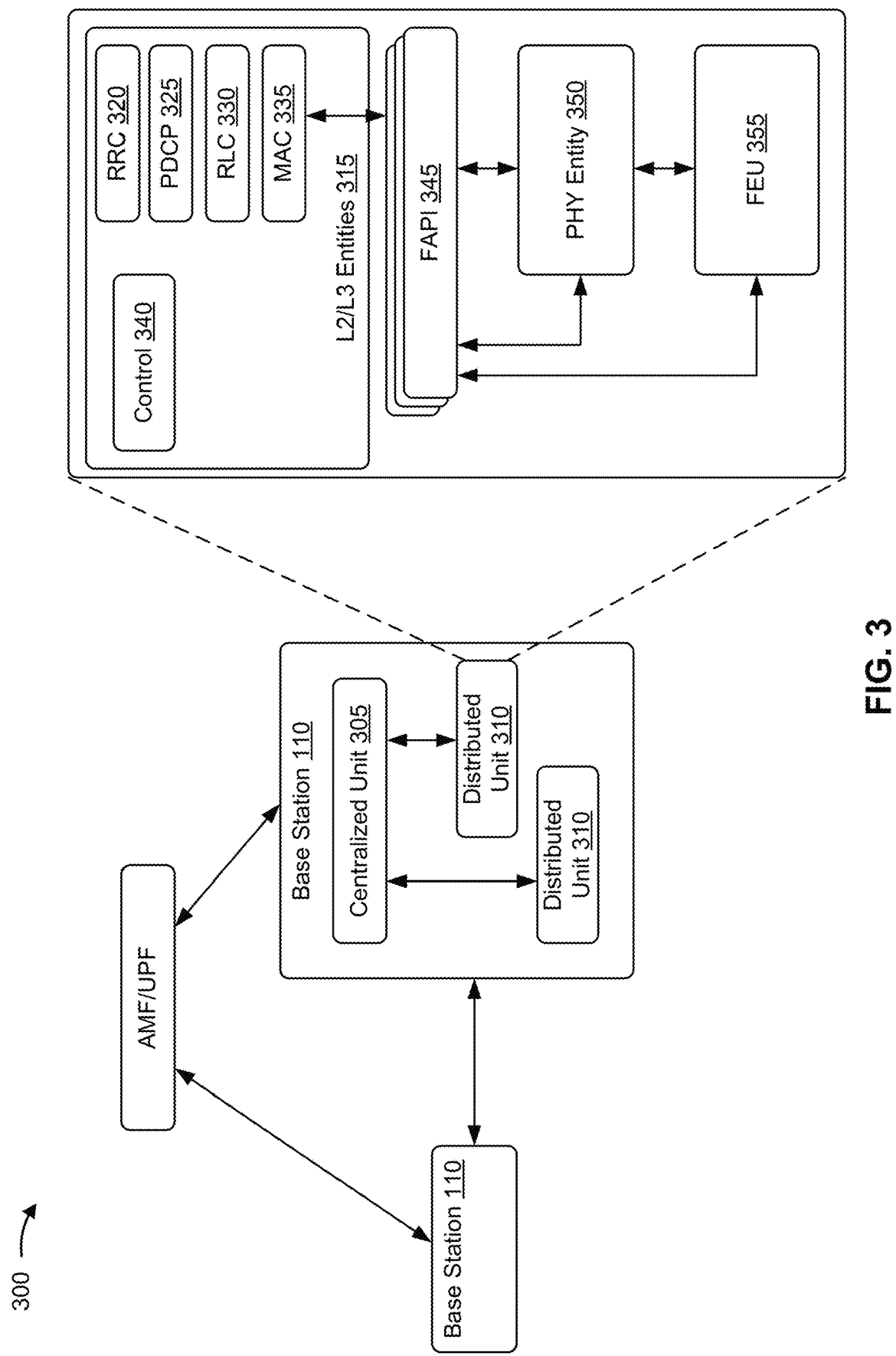
FIG. 3 is a diagram illustrating an example of entities of a base station, in accordance with the present disclosure.

FIG. 3 is a diagram illustrating an example 300 of entities of a base station, in accordance with the present disclosure. As shown in FIG. 3, a base station 110 may communicate with another base station 110 using, for example, an Xn interface. As also shown in FIG. 3, the base station 110 and/or the other base station 110 may communicate with an access and mobility management function (AMF) entity and/or a user plane function (UPF) entity using, for example, a next generation (NG) interface. The AMF and/or the UPF may include, or may be included in, one or more computing devices, such as a server device, a base station, and/or a mobility management entity.

The base station 110 may include a centralized unit 305 and/or one or more distributed units 310. The centralized unit 305 may manage communications via multiple distributed units 310. The one or more distributed units 310 may be in different geographical locations. The one or more distributed units 310 may include multiple TRPs associated with a single cell or multiple TRPs associated with multiple cells, among other examples. Each of the one or more distributed units 310 may be referred to as a base station that communicates (e.g., control information or data, among other examples) with a common centralized unit 305. The one or more distributed units 310 may communicate with the centralized unit 305 via a fronthaul network and/or a fronthaul interface.

As shown in FIG. 3, the distributed unit 310 may include one or more layer 2 and layer 3 (L2/L3) entities 315. For example, the L2/L3 entities 315 may include a radio resources control layer entity 320, a packet data convergence protocol (PDCP) layer entity 325, a radio link control (RLC) layer entity 330, MAC layer entity 335, and/or a control layer entity 340 (e.g., including a radio resource management (RRM) entity and/or a self-organizing networks (SON) entity), among other examples.

The L2/L3 entities 315 may manage communications with one or more devices, such as UEs, via the base station 110. For example, L2/L3 entities 315 may read different portions of a data packet received from a UE, may direct the data packet based at least in part on the different portions of the data packet, may determine a communication parameter based at least in part on the different portions of the data packet, and/or may generate a communication for the UE based at least in part on the different portions of the data packet, among other examples.

As shown in FIG. 3, the distributed unit 310 may include an interface for communication between the MAC layer entity 335 and a physical (PHY) layer entity 350. For example, the interface may include a functional application platform interface (FAPI) 345. The base station 110 (e.g., the distributed unit 310) may use the FAPI 345 to provide control information and/or data between the MAC layer entity 335 and the PHY layer entity 350. In some base stations 110, the MAC layer entity 335 and the PHY layer entity 350 may communicate via the FAPI 345 in a split-6 configuration. A split-6 configuration may include the distributed unit 310 that is split into a first functional unit that includes the L2/L3 entities 315 including the MAC layer entity 335 and a second functional unit that includes the PHY layer entity 350 and an FEU 355.

The FAPI 345 may include a control plane sub-interface for communicating control information between the MAC layer entity 335 and the PHY layer entity 350. The control plane sub-interface may be used to communicate in a stateful communication format. Additionally, or alternatively, the FAPI 345 may include a data sub-interface for communicating data between the MAC layer entity 335 and the PHY layer entity 350. The data sub-interface may be stateless during some or all communications. For example, the MAC layer entity 335 may configure, for each slot, a PHY channel and/or transport blocks for the PHY channel to use to transmit and/or receive data from one or more UEs.

When receiving data from a UE, the FEU 355 may receive one or more radio frequency (RF) signals (e.g., via one or more antenna groups). The FEU 355 may perform one or more operations on the RF signals, such as such as an analog to digital conversion and/or one or more digital front end operations, among other examples. The PHY layer entity 350 may receive one or more encoded data packets from the FEU 355 and may decode the one or more data packets before providing a decoded payload to the MAC layer entity 335 via the FAPI 345. The L2/L3 entities 315 may interpret the decoded payload to control one or more communications with the UE and/or to direct the decoded payload to another device (e.g., a device that includes the AMF and/or the UPF).

When transmitting the data to the UE, the PHY layer entity 350 may receive, via the FAPI 345, a payload for transmission to the UE The PHY layer entity 350 may encode the payload, may perform beamforming (e.g., digital beamforming), and/or perform one or more baseband operations on the payload in preparation for transmitting. The PHY layer entity 350 may include one or more baseband components that perform the digital beamforming. The PHY layer entity 350 may provide the payload, after performing one or more operations on the payload, to the FEU 355 via one or more baseband ports. The one or more baseband ports may be connected to one or more physical entity partition subsets that provide the payload.

The FEU 355 may perform one or more operations (e.g., using one or more devices), such as a digital to analog conversion, analog beamforming, and/or one or more digital front end operations, among other examples to transmit the payload using a radio frequency (e.g., over the air) transmission. The FEU 355 may include one or more digital front end (DFE) entities that receive the payload from the PHY layer entity 350. The one or more DFE entities may perform one or more operations, such as combining payloads from narrowbands (e.g., via narrowband chains) into a wideband payload (e.g., via a wideband chain). The one or more DFE entities may provide the wideband payload to a digital-to-analog converter (DAC) for providing to an RF entity. The RF entity may perform one or more operations on the wideband payload and transmit the wideband payload.

The FEU 355 and the PHY layer entity 350 may be separate devices or may be included in a single device. Additionally, or alternatively, the L2/L3 entities 315 may be included in one or more devices that are separate from (e.g., located in one or more different geographical locations from) the PHY layer entity 350 and/or the FEU 355.

As indicated above, FIG. 3 is provided as an example. Other examples may differ from what is described with regard to FIG. 3.

Figure 4:
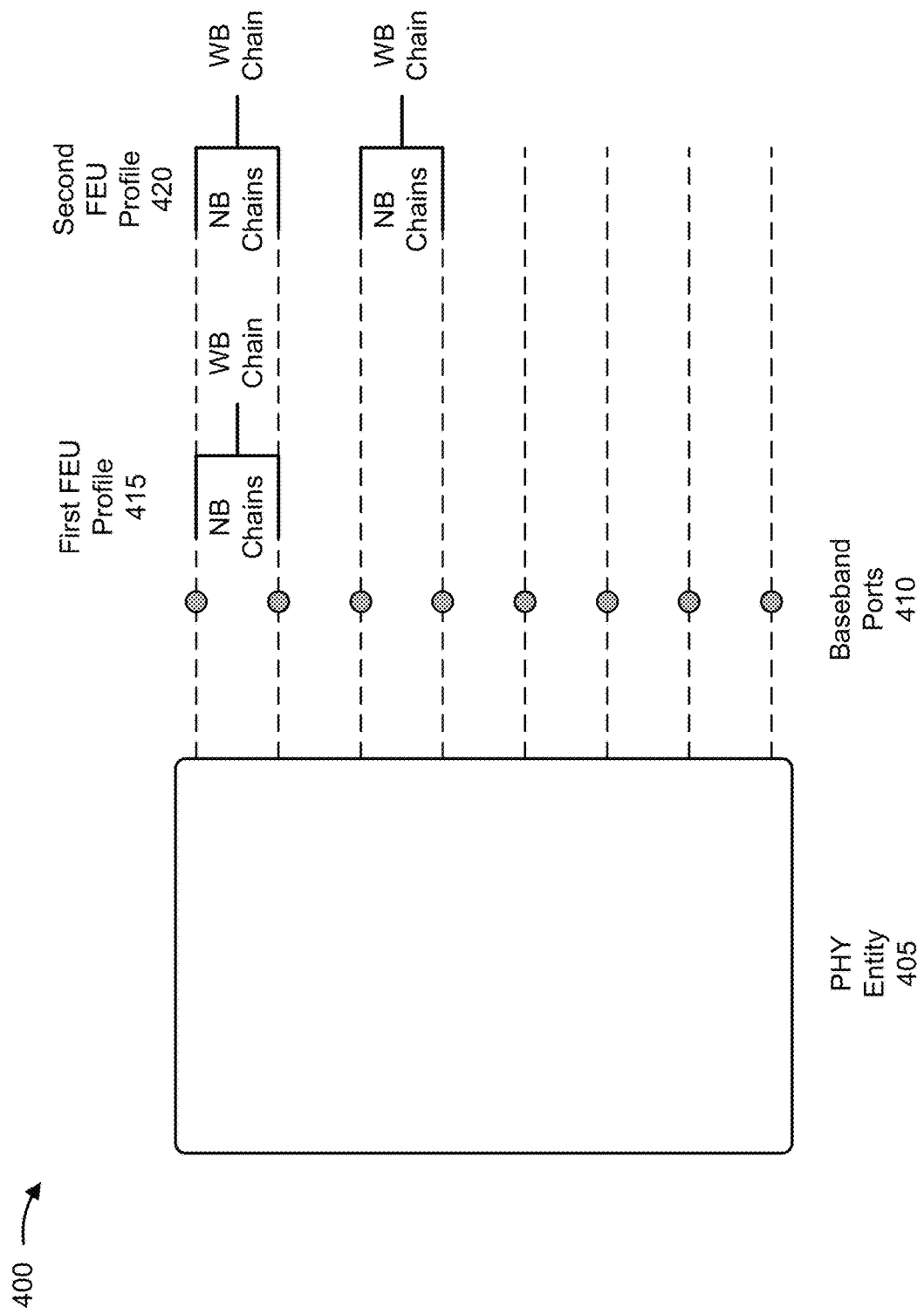
FIG. 4 is a diagram illustrating an example associated with mapping of physical entity profiles to front end unit profiles via baseband ports, in accordance with the present disclosure.

FIG. 4 is a diagram illustrating an example 400 associated with mapping of a PHY entity 405 to FEU profiles via baseband ports, in accordance with the present disclosure. The PHY entity 405 and an FEU may be included in an RU of a base station.

The PHY entity 405 of the RU may perform one or more operations, such as digital beamforming or baseband processing, among other examples. The PHY entity 405 may provide a payload, via baseband ports 410, to the FEU.

As shown in FIG. 4, the FEU may include multiple candidate FEU profiles, such as a first FEU profile 415 and a second FEU profile 420. As shown, the first FEU profile 415 may be connected to multiple baseband ports. The first FEU profile 415 may receive multiple signals via multiple narrowband chains, combine the multiple signals (e.g., using a combiner), and process the combined multiple signals via a wideband chain. The first FEU profile 415 may be configured to output the combined multiple signals to an RF unit for transmission to another device. The second FEU profile 420 may receive multiple signals via multiple narrowband chains, combine the multiple signals, and process the combined multiple signals via multiple wideband chains. The second FEU profile 420 may be configured to output the combined multiple signals to one or more RF units for transmission to one or more other devices.

Each narrowband chain of the FEU profiles may be associated with a different component carrier (e.g., a different cell) and/or each wideband chain of the FEU profiles may be associated with a different stream and/or with a different beam direction. An FEU profile may indicate how many narrowband chains are connected per wideband chain. An FEU profile may indicate mapping from the wideband chains to RF units of the RU and/or from the narrowband chains to the wideband chains.

As indicated above, FIG. 4 is provided as an example. Other examples may differ from what is described with regard to FIG. 4.

In some networks, a FAPI may provide an interface to indicate control information from a DU (e.g., L2/L3 entities) to a PHY entity and/or an FEU. For example, the DU may indicate a selection of an FEU profile to use for communication with one or more UEs. However, the DU may indicate a selection of an FEU profile without consideration of whether the FEU profile is compatible with the PHY entity.

In some networks, baseband port labels for communications between the DU and the FEU may be unique and/or hardcoded. In some aspects the labeling may also include a direction (e.g., downlink or uplink) for the port. In this way, a control message may indicate a baseband port with a label that is understood by the DU and the FEU. However, logical baseband ports for communication between the DU and the PHY entity may not have explicit labels and/or may not have unique and/or hardcoded labels outside of the context of a PHY entity's, or a PHY partition's, context. The DU may indicate logical baseband ports implicitly with labels that are understood by the PHY entity, or an instance of the PHY entity. Based at least in part on the logical baseband ports for communications between the DU and the PHY entity not having explicit labels, the DU may not understand compatibility between indications of logical baseband port labels of the PHY entity and FEU profiles. This may cause an error, for example, if the PHY entity outputs signals to one or more baseband ports that do not correspond with intended input ports of the FEU. Based at least in part on the error, the base station may not transmit the signals to an intended UE, may receive an indication from the UE of a failure to receive the signals, and may consume power, network, communication, and/or computing resources to attempt to transmit again, or may operate outside of acceptable parameters.

In some aspects described herein, an RU of a base station may transmit, to a DU of the base station, an indication of one or more candidate PHY profiles for selection by the DU. The RU may receive, from the DU, an indication of a selected PHY profile, of the one or more candidate PHY profiles, to use for communication with a device, such as a UE.

For each PHY profile, the RU may provide a PHY profile identification, (e.g., a 16 bit profile identification), a number of PHY partition subsets supported, and/or one or more parameters for each PHY partition subset. In some aspects, the PHY entity may be partitioned over a set of uniquely labeled baseband ports at an interface between a set of PHYs (e.g., PHY partition subsets) and a set of FEU components. For example, the parameters may include a PHY partition subset identification, such as a PHY ID, a number of local baseband ports connected to the PHY partition subset, and/or a mapping of local baseband port identifications with baseband port identifications known to an FEU; as an example, the mapping can be via global baseband port identifiers that are unambiguous for the DU and RU configuration. In some cases, the partition subsets may be non-overlapping.

In some aspects, the RU may provide information to the DU to avoid, or correct, selection of a PHY profile that is incompatible with a selected FEU profile (e.g., a DFE profile or including a DFE profile). For example, the RU may provide information to the DU to avoid selection of a PHY profile that would result in pairing the PHY profile with an FEU profile that would result in open ports (e.g., not all baseband ports are assigned to PHY entities), an insufficient number of PHY partition subsets for a number of FEU inputs of the FEU profile, or a number of PHY partition subsets exceeding a threshold number of PHY partition subsets per transmission chain of the RU (e.g., based at least in part on a peak-to-average-power ratio (PAPR) or adjacent channel leakage power ratio (ACLR) restrictions), or a configuration that is incompatible with underlying internal data or control path architecture limitations in PHY entity components, FEU components or a combination thereof.

In some aspects, the RU may receive an indication of a selected PHY profile that is incompatible with a selected FEU profile. Based at least in part on the selected PHY profile being incompatible with the selected FEU profile, the RU may provide feedback to the DU to indicate that the selected PHY profile is incompatible with the selected FEU profile. In some aspects, the RU may further indicate a recommended PHY profile to pair with the selected FEU profile and/or a recommended FEU profile to pair with the selected PHY profile.

In some aspects, the RU may provide an indication of a profile compatibility mapping that indicates pairings of FEU profiles and compatible PHY profiles. The RU may receive an indication of a selected PHY profile that is compatible with a selected FEU profile based at least in part on the indication of the profile compatibility mapping. In some aspects, a compatibility map may list all allowable mappings. In some other aspects, a full list of allowable maps may be derived from the compatibility map. The compatibility map may indicate compatibility between a PHY profile and a FEU profile where PHYx has N antennas may imply, directly or based at least in part on additional capability signaling, a profile where PHYx has M<N antennas, where any, or possibly a further restricted, M-size subset of the original N broadband antennas ports can be selected. When M<N, further signaling may be used to indicate which broadband ports are selected.

In some aspects, the RU may receive a request for partition subset capabilities from the DU. The RU may provide an indication of PHY profile and FEU profile pairings that satisfy at least a portion of the partition subset capabilities. The RU may receive an indication of a selected PHY profile and a selected FEU profile that is based at least in part on the indication of the PHY profile and FEU profile pairings.

In some aspects, compatibility between a PHY profile and an FEU profile may imply compatibility involving any, or a restricted, subset of the broadband ports at the interface between the components of the profiles. The configuration of the selected subset may be indicated by further signaling (e.g., with a profile selection, configuration of a PHY in the profile, or configuration of a FEU component in the profile). A compatibility of subsets may be further restricted by signaling that indicates a subset restriction (e.g., "open ports disallowed" or "all ports for the same wideband (WB) chain must be either disable or enabled in the PHY").

Based at least in part on the PHY entity indicating PHY entity profiles and/or based at least in part on logical baseband ports for communications between the DU and the PHY entity having explicit labels, the DU may understand compatibility between indications of logical baseband port labels of the PHY entity with FEU profiles. This may reduce errors caused by the PHY entity outputting signals to one or more baseband ports that do not correspond with intended input ports of the FEU. This may conserve power, network, communication, and/or computing resources that may otherwise have been used to attempt to schedule and transmit the signals again.

Figure 5:
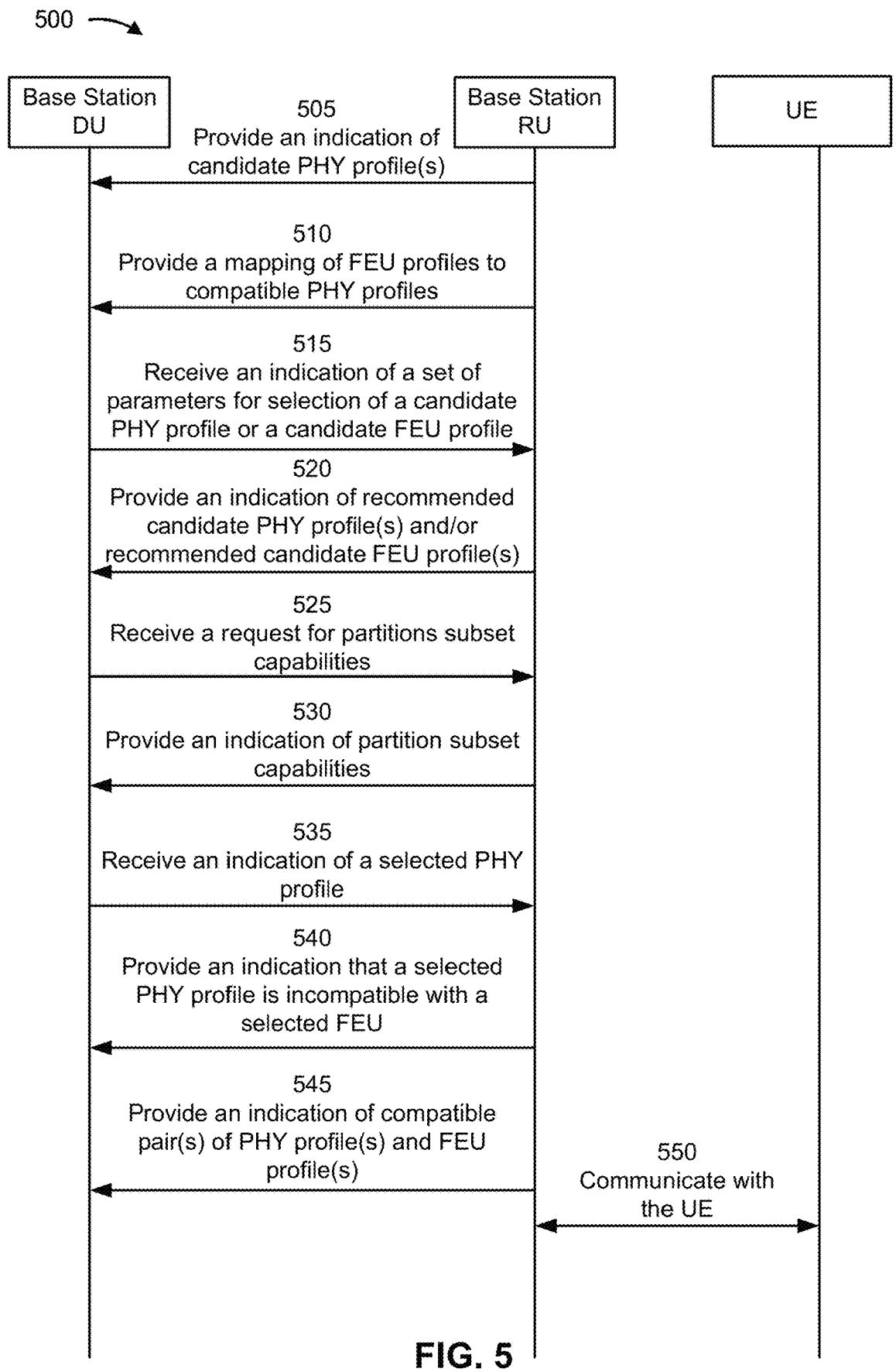
FIGS. 5 and 6 are diagrams illustrating examples associated with physical entity profiles of a radio unit, in accordance with the present disclosure.

FIG. 5 is a diagram illustrating an example 500 associated with PHY profiles of an RU, in accordance with the present disclosure. As shown in FIG. 5, a UE (e.g., UE 120) may communicate with a base station (e.g., base station 110) via an RU of the base station. The UE and the base station may be part of a wireless network (e.g., wireless network 100). The base station may be configured with a split-6 configuration in which a distributed unit of the base station is split into a first functional unit that includes L2/L3 layer entities (e.g., e.g., a DU) and a second functional unit (e.g., an RU). In some aspects, operations performed by the DU may be performed by a virtual network function (VNF) of the DU and/or operations performed by the RU may be performed by a physical network function (PNF) of the RU.

As shown by reference number 505, the RU may provide, and the DU may receive, an indication of one or more candidate PHY profiles. In some aspects, an indication of a PHY profile, of the one or more candidate PHY profiles, may indicate a PHY profile identification and/or a number of partition subsets supported in the PHY profile, among other examples. In some aspects, for a partition subset supported in the PHY profile, the PHY profile may indicate one or more of a partition subset identifier, a number of local baseband ports associated with the partition subset, and global baseband port identifications for the local baseband ports associated with the partition subset.

As shown by reference number 510, the RU may provide, and the DU may receive, a mapping of FEU profiles to compatible PHY profiles. In some aspects, the mapping may include a matrix of validity indications, a list of valid (e.g., compatible) pairings, a list of invalid (e.g., incompatible) pairings, and/or an encoded indication of the mapping.

In some aspects, the mapping may include Booleans, integers, or bits, among other examples, as validity flags. In some aspects, a list may be represented as a bitmap with dimension cell $\{(\#PHY\ profiles*\#DFE\ profiles)/8\}$ and/or with deterministic mapping between each bit and a corresponding entry in a validity matrix.

In some aspects, the mapping may include a list of valid (PHY profile, FEU profile)-tuples (e.g., all unlisted tuples may be invalid or may have validity derivable based at least in part on the valid tuples). In some aspects, the mapping may include a list of invalid (PHY profile, DFE profile)-tuples. In some aspects, the mapping may include hybrid signaling where some parts (e.g., submatrices) of a validity matrix are represented as an actual matrix and other parts are represented as a list of valid or invalid tuples. In some aspects, the mapping may include a general compression mechanism (e.g., run-length encoding (RLE) or Lempel-Ziv-Welch (LZW), among other examples) that includes values of the mapping. In some aspects, the mapping may include a specialized compression mechanism (e.g., only a subset of salient compatible profiles may be indicated and a remainder of the compatible profiles may be derivable based at least in part on explicitly indicated compatible profiles). In some aspects, multiple encodings may be possible for indicating the mapping. In these scenarios, the RU may signal an indication of a selection of an encoding scheme that is selected for signaling the mapping.

As shown by reference number 515, the RU may receive, and the DU may provide, an indication of a set of parameters for selection of a candidate PHY profile or a candidate FEU profile. In some aspects, the set of parameters may include a selection of a candidate PHY profile, a selection of a candidate FEU profile, and/or a set of proposed PHY profile and FEU profile pairings, among other examples. For example, the set of parameters may include a selection of a candidate FEU profile and may indicate a request for a recommended PHY profile to pair with the candidate FEU profile.

In some aspects, the set of parameters may include an indication of intended parameters associated with the selected PHY profile, intended parameters associated with the selected FEU profile, and/or a number of component carriers to use for communication with the device, among other examples. In some aspects, the set of parameters may include a minimum number or a maximum number of transmit or receive baseband ports and/or an ability to pair with FEU profiles with a minimum number of transmit reference signals in particular bands, among other examples.

As shown by reference number 520, the RU may provide, and the DU may receive, an indication of one or more recommended candidate PHY profiles and/or one or more recommended candidate FEU profiles. For example, the RU may provide one or more of these indications based at least in part on receiving the indication of the set of parameters for selection of the candidate PHY profile or the candidate FEU profile.

In some aspects, the RU may provide a set of PHY profiles that satisfy the set of parameters, a set of PHY profiles that satisfy a subset of the set of parameters, or an indication that the set of parameters is rejected. For example, the RU may indicate that the set of parameters is rejected based at least in part on the RU not being configured with a PHY profile and FEU profile pair that satisfy all of the set of parameters or not being configured with a PHY profile and FEU profile pair that satisfy a threshold number, or percentage, of the set of parameters, among other examples. In some aspects, the RU may indicate a reason for rejection of the set of parameters.

As shown by reference number 525, the RU may receive, and the DU may provide, a request for partition subset capabilities. In some aspects, the request may be associated with a PHY profile. For example, the DU may request an indication of connections of a partition subset to baseband ports, a supportable bandwidth, a maximum number of layers, a maximum number of supported UEs, and/or a maximum number of physical downlink shared channels per slot, among other examples.

As shown by reference number 530, the RU may provide, and the DU may receive, an indication of partition subset capabilities. For example, the RU may provide an indication of mapping of FEU profiles to compatible PHY profiles and/or an indication of baseband ports connected to partition subsets, among other examples.

In some aspects, the indication of partition subset capabilities may include an indication of a dependency of the partition subset capabilities on a selection of a PHY profile or an FEU profile. For example, the indication of the dependency may include an explicit indication of the dependency and/or an invariant-based dependency. In some aspects, parameters subject to dependency may be signaled as one or more lists of tuples (e.g., a number of baseband ports and capability), where the number of baseband ports can be for a particular direction (e.g., uplink or downlink), or total number of BB ports connected to the partition subset. In some aspects, the parameters indicated with invariant dependency may be interpreted based at least in part on a configured scaling as a function of baseband ports and/or antenna ports. In some aspects, the invariant may be based at least in part on a stated or implied parameter, such as an assumed number of computational units expressed, for example, as a product of other units (e.g., maximum bandwidth x maximum number of layers).

As shown by reference number 535, the DU may receive, and the RU may provide, an indication of a selected PHY profile, of the one or more candidate PHY profiles.

As shown by reference number 540, the RU may provide, and the DU may receive, an indication that a selected PHY profile is incompatible with a selected FEU.

In some aspects, the selected PHY profile may be incompatible with the selected FEU profile based at least in part on a determination that the selected PHY profile would cause input ports of the FEU to be open ports. In some aspects, the selected PHY profile may be incompatible with the selected FEU profile based at least in part on a determination that the selected PHY profile would cause multiple component carriers configured for the FEU to be connected to a single PHY partition subset. In some aspects, the selected PHY profile may be incompatible with the selected FEU profile based at least in part on a PAPR parameter or an adjacent channel leakage ratio parameter that indicates a single PHY partition subset is to be connected to a transmission RU.

In some aspects, the RU may receive the indication of the selected PHY profile that is incompatible with the FEU profile based at least in part on the UE not providing the mapping of FEU profiles to compatible PHY profiles and/or the DU selecting pair of a PHY profile and an FEU profile that are not indicated as being compatible.

In some aspects, the DU may store the indication that the PHY profile and the FEU profile are incompatible and/or avoid pairing the selected PHY profile and the selected FEU in subsequent selections.

As shown by reference number 545, the RU may provide, and the DU may receive, an indication of one or more compatible pairs of PHY profiles and FEU profiles.

In some aspects, the RU may provide an indication of one or more recommended PHY profiles, of the one or more candidate PHY profiles, and/or an indication of one or more recommended FEU profiles that are compatible with the selected PHY profile. For example, the RU may provide one or more of these indications based at least in part on determining that the selected PHY profile is incompatible with the selected FEU and/or providing the indication that the selected PHY profile is incompatible with the selected FEU. In some aspects, the RU may provide one or more recommended PHY profiles and/or FEU profiles that are associated with an associated DFE profile (e.g., FEU profile). In some aspects, the RU may provide a recommendation of all, or a subset of all, PHY profiles that are compatible with the indicated FEU profile. Additionally, or alternatively, the RU may provide a recommendation of all, or a subset of all, FEU profiles that are compatible with the indicated PHY profile.

As shown by reference number 550, the base station may communicate with the UE via the RU. For example, the RU of the base station may transmit and or receive communications with the UE based at least in part on selected PHY profiles and/or FEU profiles.

Based at least in part on the PHY entity indicating PHY entity profiles, the DU may understand compatibility between indications of logical baseband port labels of the PHY entity with FEU profiles. This may reduce errors cause by PHY entity outputting signals to one or more baseband ports that do not correspond with intended input ports of the FEU. This may conserve power, network, communication, and/or computing resources that may otherwise have been used to attempt to schedule and transmit the signals again.

As indicated above, FIG. 5 is provided as an example. Other examples may differ from what is described with regard to FIG. 5. For example, the RU and the DU may perform only a subset of operations shown above. In a first example, the RU and DU may perform the operations described with reference to reference numbers 505, 535, 540, and/or 545. In second example, the RU and the DU may perform the operations described with reference to reference numbers 505, 510, and/or 535. In third example, the RU and the DU may perform the operations described with reference to reference numbers 505, 515, 520, and/or 535.

Figure 6:
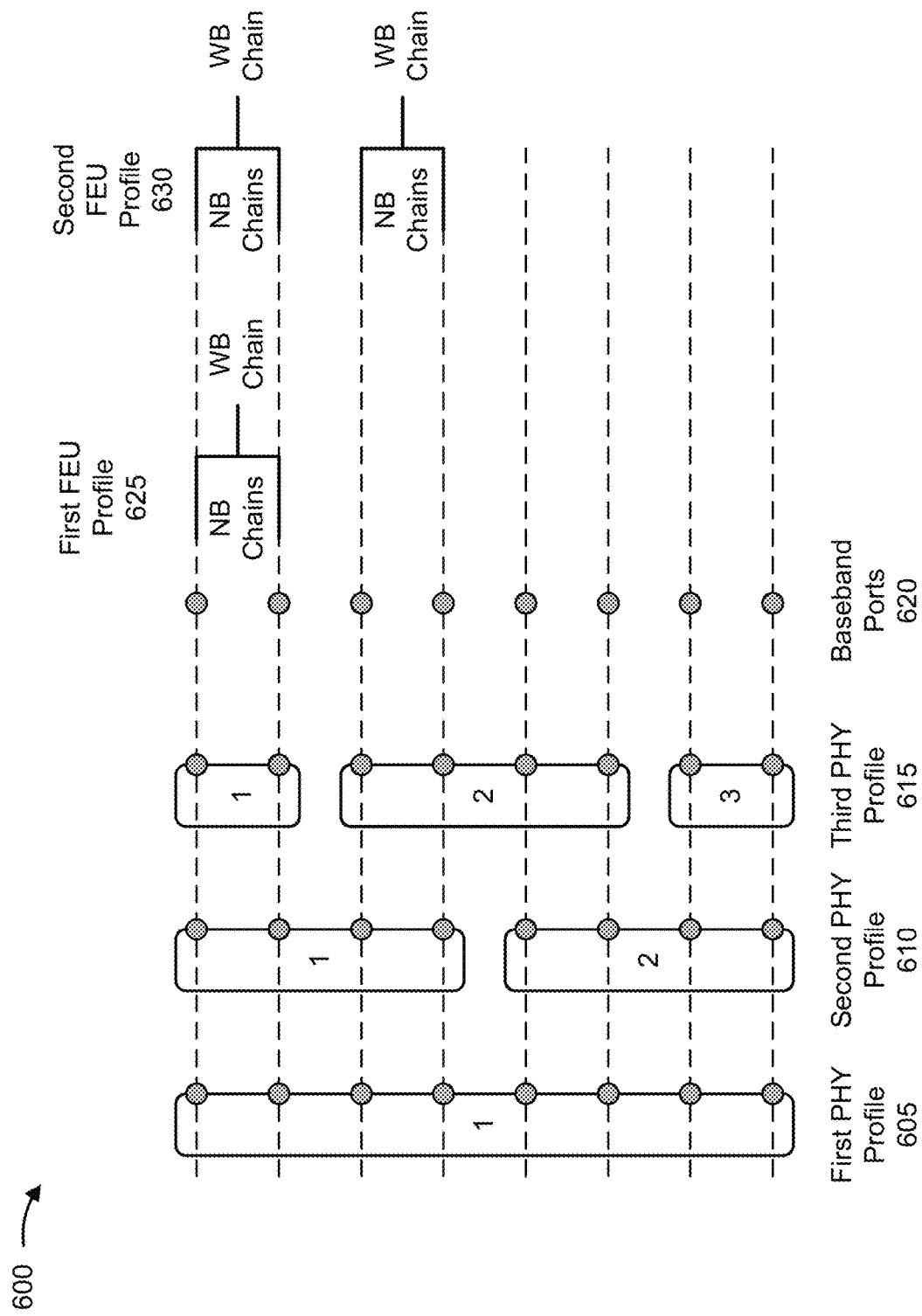

FIG. 6 is a diagram illustrating an example 600 associated with mapping of PHY entity profiles to FEU profiles via baseband ports, in accordance with the present disclosure. The PHY entity profiles and FEU profiles may be included in an RU of a base station.

A PHY entity of the RU may include multiple candidate PHY entity profiles, such as a first PHY entity profile 605, a second PHY entity profile 610, and/or a third PHY entity profile 615 that may be connected to baseband ports 620. As shown, the first PHY entity profile 605 may include a single PHY partition subset (e.g., with a single PHY connected to all baseband ports 620). The second PHY entity profile 610 may include a first PHY partition subset connected to a first subset of the baseband ports 620 and a second PHY partition subset connected to a second subset of the baseband ports 620. The third PHY entity profile 615 may include a first PHY partition subset connected to a first subset of the baseband ports 620, a second PHY partition subset connected to a second subset of the baseband ports 620, and a third PHY partition subset connected to a third subset of the baseband ports 620.

As further shown in FIG. 6, the FEU may include multiple candidate FEU profiles, such as a first FEU profile 625 and a second FEU profile 630. As shown, the first FEU profile 625 may be connected to multiple baseband ports. The first FEU profile 625 may receive multiple signals via multiple (e.g., 2) narrowband chains, combine the multiple signals (e.g., using a combiner), and process the combined multiple signals via a wideband chain. The first FEU profile 625 may be configured to output the combined multiple signals to an RF unit for transmission to another device. The second FEU profile 630 may receive multiple (e.g., 4) signals via multiple narrowband chains, combine the multiple signals, and process the combined multiple signals via multiple wideband chains. The second FEU profile 630 may be configured to output the combined multiple signals to one or more RF units for transmission to one or more other devices.

As indicated above, FIG. 6 is provided as an example. Other examples may differ from what is described with regard to FIG. 6.

Figure 7:
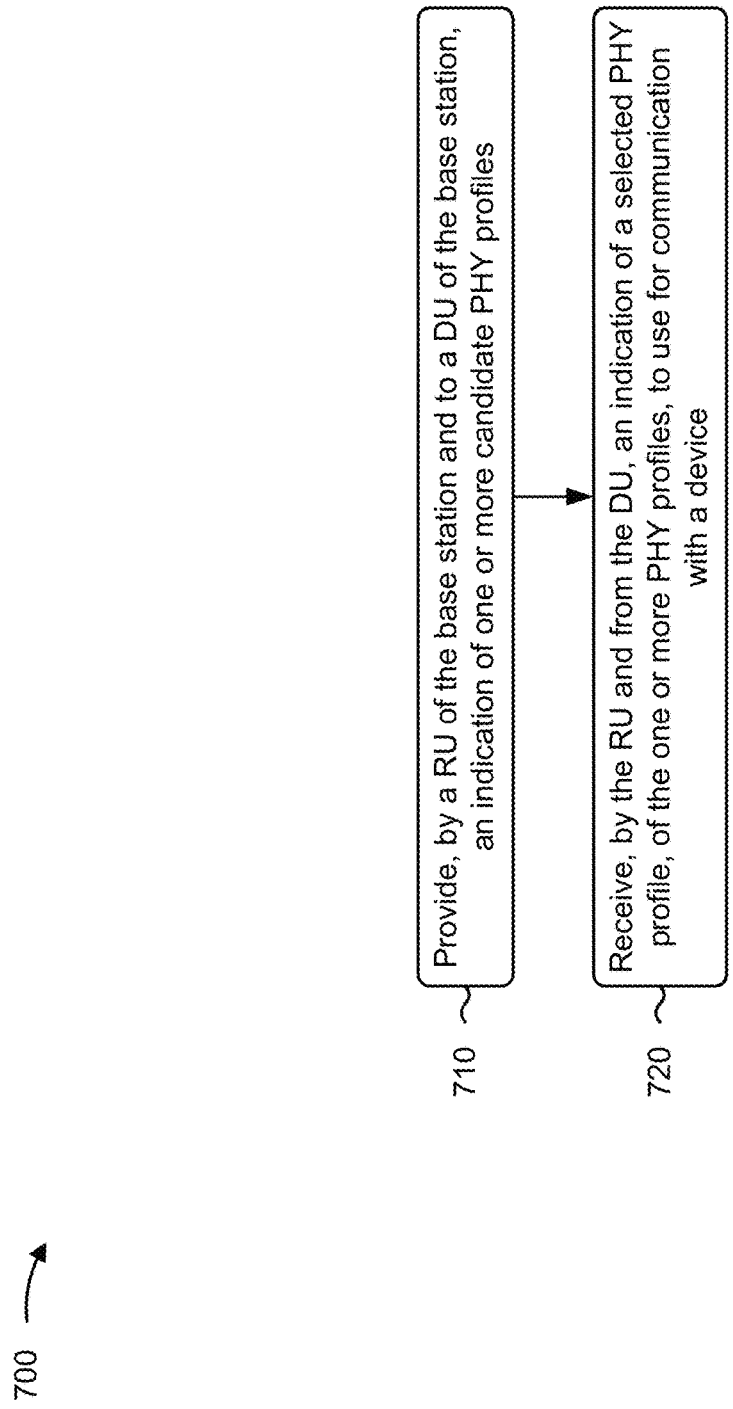
FIG. 7 is a diagram illustrating an example process associated with physical entity profiles of a radio unit, in accordance with the present disclosure.

FIG. 7 is a diagram illustrating an example process 700 performed, for example, by a base station, in accordance with the present disclosure. Example process 700 is an example where the base station (e.g., base station 110) performs operations associated with PHY profiles of an RU.

As shown in FIG. 7, in some aspects, process 700 may include providing, to a DU of the base station, an indication of one or more candidate PHY profiles (block 710). For example, the base station (e.g., using communication manager 808, depicted in FIG. 8) may provide, to a DU of the base station, an indication of one or more candidate PHY profiles, as described above.

As further shown in FIG. 7, in some aspects, process 700 may include receiving, from the DU, an indication of a selected PHY profile, of the one or more candidate PHY profiles, to use for communication with a device (block 720). For example, the base station (e.g., using communication manager 808, depicted in FIG. 8) may receive, from the DU, an indication of a selected PHY profile, of the one or more candidate PHY profiles, to use for communication with a device, such as a UE, as described above.

Process 700 may include additional aspects, such as any single aspect or any combination of aspects described below and/or in connection with one or more other processes described elsewhere herein.

In a first aspect, process 700 includes providing, by the RU and to the DU, an indication that the selected PHY profile is incompatible with a selected FEU profile.

In a second aspect, alone or in combination with the first aspect, the selected PHY profile is incompatible with the selected FEU profile based at least in part on one or more of the selected PHY profile would cause input ports of the FEU to be open ports, the selected PHY profile would cause multiple component carriers configured for the FEU to be connected to a single PHY partition subset, a peak-to-average power ratio parameter or an adjacent channel leakage ratio parameter that indicates a single PHY partition subset is to be connected to a transmission RU, or internal data or control path architecture limitations in PHY components, FEU components or a combination thereof In a third aspect, alone or in combination with one or more of the first and second aspects, process 700 includes providing, by the RU and to the DU, an indication of one or more recommended PHY profiles, of the one or more candidate PHY profiles, or providing, by the RU and to the DU, an indication of one or more recommended FEU profiles that are compatible with the selected PHY profile.

In a fourth aspect, alone or in combination with one or more of the first through third aspects, process 700 includes providing, by the RU and to the DU, an indication of one or more compatible pairs of PHY profiles and/or FEU profiles that match an intended FEU profile.

In a fifth aspect, alone or in combination with one or more of the first through fourth aspects, process 700 includes providing a mapping of FEU profiles to compatible PHY profiles.

In a sixth aspect, alone or in combination with one or more of the first through fifth aspects, the mapping of digital front unit profiles to compatible PHY profiles comprises one or more of a matrix of validity indications, a list of valid parings, a list of invalid pairings, or an encoded indication of the mapping.

In a seventh aspect, alone or in combination with one or more of the first through sixth aspects, process 700 includes receiving, by the RU and from the DU, an indication of a set of parameters for selection of one or more of a candidate PHY profile or a candidate FEU profile, and providing, by the RU and to the DU, an indication of one or more recommended PHY profiles, of the one or more candidate PHY profiles, or one or more recommended FEU profiles based at least in part on the set of parameters, wherein reception of the indication of the selected PHY profile is based at least in part on the indication of the one or more recommended PHY profiles.

In an eighth aspect, alone or in combination with one or more of the first through seventh aspects, the set of parameters include one or more indications of a selection of a candidate PHY profile, a selection of a candidate FEU profile, intending parameters associated with the selected PHY profile, intending parameters associated with the selected FEU profile, a number of component carriers to use for communication with the device, or a set of proposed PHY profile and FEU profile pairings.

In a ninth aspect, alone or in combination with one or more of the first through eighth aspects, providing the indication of one or more recommended PHY profiles comprises providing a set of PHY profiles that satisfy the set of parameters, providing a set of PHY profiles that satisfy a subset of the set of parameters, or an indication that the set of parameters is rejected.

In a tenth aspect, alone or in combination with one or more of the first through ninth aspects, the indication that the set of parameters is rejected comprises an indication of a reason for rejection of the set of parameters.

In an eleventh aspect, alone or in combination with one or more of the first through tenth aspects, a PHY profile, of the one or more candidate PHY profiles, comprises indications of one or more of a PHY profile identification, a number of partitions subsets supported in the PHY profile, or for a partition subset supported in the PHY profile, one or more of a partition subset identifier, a number of local baseband ports associated with the partition subset, and global baseband port identifications for the local baseband ports associated with the partition subset.

In a twelfth aspect, alone or in combination with one or more of the first through eleventh aspects, process 700 includes receiving, by the RU and from the DU, a request for partition subset capabilities, and providing, by the RU and to the DU, an indication of partition subset capabilities.

In a thirteenth aspect, alone or in combination with one or more of the first through twelfth aspects, the partition subset capabilities are based at least in part on a selection of a PHY profile or a FEU profile.

In a fourteenth aspect, alone or in combination with one or more of the first through thirteenth aspects, providing the indication of partition subset capabilities that are based at least in part on a selection of a PHY profile or a FEU profile comprises providing an indication of a dependency of the partition subset capabilities on a selection of a PHY profile or a FEU profile.

In a fifteenth aspect, alone or in combination with one or more of the first through fourteenth aspects, the indication of the dependency of the partition subset capabilities on a selection of a PHY profile or a FEU profile comprises one or more of an explicit indication of the dependency, or an invariant-based dependency.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
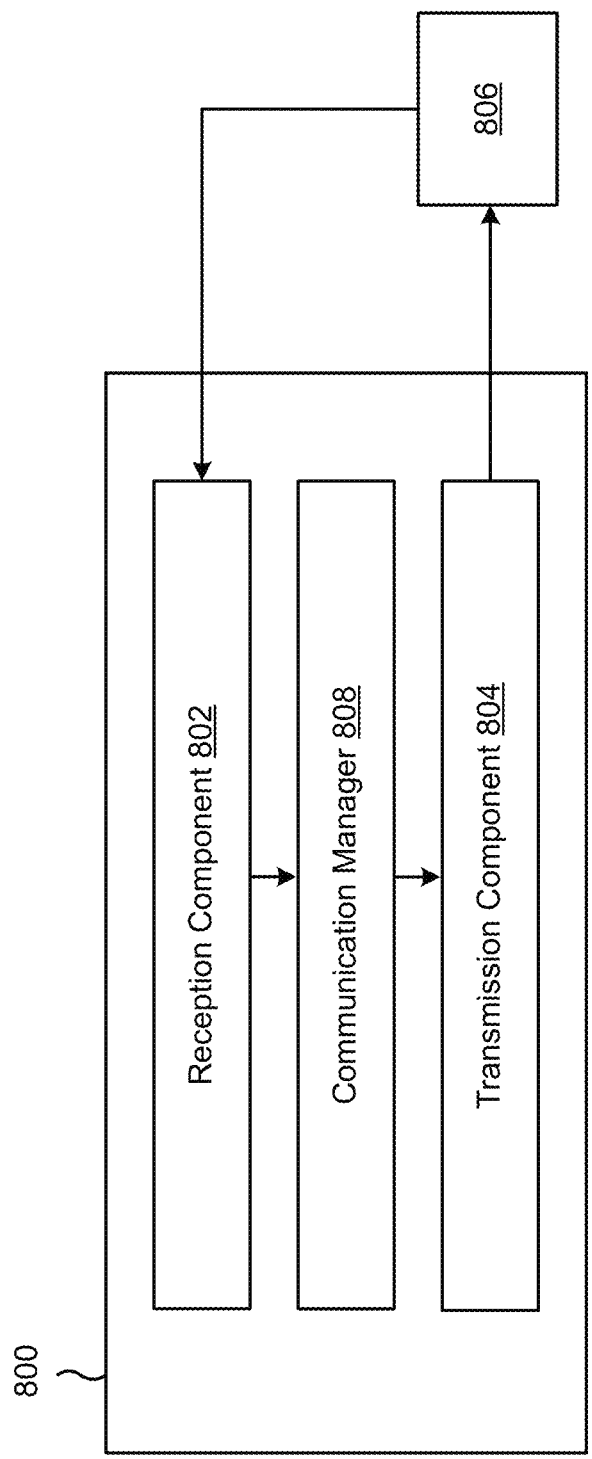
FIG. 8 is a block diagram of an example apparatus for wireless communication, in accordance with the present disclosure.

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808. In some implementations, the communication manager may include a VNF, a PNF, and/or a FAPI, among other examples.

In some aspects, the apparatus 800 may be configured to perform one or more operations described herein in connection with FIGS. 5 and 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The communication manager 808 may provide, to a DU of the base station, an indication of one or more candidate PHY profiles. The reception component 802 may receive, from the DU, an indication of a selected PHY profile, of the one or more candidate PHY profiles, to use for communication with a device, such as a UE.

The communication manager 808 may provide, to the DU, an indication that the selected PHY profile is incompatible with a selected FEU profile.

The communication manager 808 may provide, to the DU, an indication of one or more recommended PHY profiles, of the one or more candidate PHY profiles.

The communication manager 808 may provide, to the DU, an indication of one or more recommended FEU profiles that are compatible with the selected PHY profile.

The communication manager 808 may provide, to the DU, an indication of one or more compatible pairs of PHY profiles and FEU profiles that match an intended FEU profile.

The communication manager 808 may provide a mapping of FEU profiles to compatible PHY profiles.

The communication manager 808 may receive, from the DU, an indication of a set of parameters for selection of one or more of a candidate PHY profile or a candidate FEU profile.

The communication manager 808 may provide, to the DU, an indication of one or more recommended PHY profiles, of the one or more candidate PHY profiles, or one or more recommended FEU profiles based at least in part on the set of parameters wherein reception of the indication of the selected PHY profile is based at least in part on the indication of the one or more recommended PHY profiles.

The communication manager 808 may receive, from the DU, a request for partition subset capabilities.

The communication manager 808 may provide, to the DU, an indication of partition subset capabilities.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a base station, comprising: providing, by a radio unit (RU) of the base station and to a distributed unit (DU) of the base station, an indication of one or more candidate physical entity (PHY) profiles; and receiving, by the RU and from the DU, an indication of a selected PHY profile, of the one or more candidate PHY profiles, to use for communication with a device.

Aspect 2: The method of Aspect 1, further comprising: providing, by the RU and to the DU, an indication that the selected PHY profile is incompatible with a selected front end unit profile.

Aspect 3: The method of Aspect 2, wherein the selected PHY profile is incompatible with the selected front end unit profile based at least in part on one or more of: the selected PHY profile would cause input ports of the front end unit to be open ports, the selected PHY profile would cause multiple component carriers configured for the front end unit to be connected to a single PHY partition subset, or a peak-to-average power ratio parameter or an adjacent channel leakage ratio parameter that indicates a single PHY partition subset is to be connected to a transmission radio unit.

Aspect 4: The method of any of Aspects 2-3, further comprising: providing, by the RU and to the DU, an indication of one or more recommended PHY profiles, of the one or more candidate PHY profiles, or providing, by the RU and to the DU, an indication of one or more recommended front end unit profiles that are compatible with the selected PHY profile.

Aspect 5: The method of any of Aspects 2-4, further comprising: providing, by the RU and to the DU, an indication of one or more compatible pairs of PHY profiles— and front end unit profiles that match an intended front end unit profile.

Aspect 6: The method of any of Aspects 2-5, further comprising: providing a mapping of front end unit profiles to compatible PHY profiles.

Aspect 7: The method of Aspect 6, wherein the mapping of digital front unit profiles to compatible PHY profiles comprises one or more of: a matrix of validity indications, a list of valid parings, a list of invalid pairings, or an encoded indication of the mapping.

Aspect 8: The method of Aspect 1, further comprising: receiving, by the RU and from the DU, an indication of a set of parameters for selection of one or more of a candidate PHY profile or a candidate front end unit profile; and providing, by the RU and to the DU, an indication of one or more recommended PHY profiles, of the one or more candidate PHY profiles, or one or more recommended front end unit profiles based at least in part on the set of parameters, wherein reception of the indication of the selected PHY profile is based at least in part on the indication of the one or more recommended PHY profiles.

Aspect 9: The method of Aspect 8, wherein the set of parameters include one or more indications of: a selection of a candidate PHY profile, a selection of a candidate front end unit profile, intended parameters associated with the selected PHY profile, intended parameters associated with the selected front end unit profile, a number of component carriers to use for communication with the device, or a set of proposed PHY profile and front end unit profile pairings.

Aspect 10: The method of any of Aspects 8-9, wherein providing the indication of one or more recommended PHY profiles comprises: providing a set of PHY profiles that satisfy the set of parameters, providing a set of PHY profiles that satisfy a subset of the set of parameters, or an indication that the set of parameters is rejected.

Aspect 11: The method of Aspect 10, wherein the indication that the set of parameters is rejected comprises an indication of a reason for rejection of the set of parameters.

Aspect 12: The method of any of Aspects 1-11, wherein a PHY profile, of the one or more candidate PHY profiles, comprises indications of one or more of: a PHY profile identification, a number of partitions subsets supported in the PHY profile, or for a partition subset supported in the PHY profile, one or more of a partition subset identifier, a number of local baseband ports associated with the partition subset, and global baseband port identifications for the local baseband ports associated with the partition subset.

Aspect 13: The method of Aspect 1, further comprising: receiving, by the RU and from the DU, a request for partition subset capabilities; and providing, by the RU and to the DU, an indication of partition subset capabilities.

Aspect 14: The method of Aspect 13, wherein the partition subset capabilities are based at least in part on a selection of a PHY profile or a front end unit profile.

Aspect 15: The method of Aspect 14, wherein providing the indication of partition subset capabilities that are based at least in part on a selection of a PHY profile or a front end unit profile comprises: providing an indication of a dependency of the partition subset capabilities on a selection of a PHY profile or a front end unit profile.

Aspect 16: The method of Aspect 15, wherein the indication of the dependency of the partition subset capabilities on a selection of a PHY profile or a front end unit profile comprises one or more of: an explicit indication of the dependency, or an invariant-based dependency.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the memory and the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radio unit for wireless communication, comprising:
a memory; and
one or more processors coupled to the memory, wherein the one or more processors are configured to:
provide, to a distributed unit (DU), an indication of one or more candidate physical entity (PHY) profiles;
receive, from the DU, an indication of a particular PHY profile of the one or more candidate PHY profiles to use for communication with a device; and
provide, to the DU, an indication of one or more recommended front end unit profiles that are compatible with the particular PHY profile.

2. The radio unit of claim 1, wherein the one or more processors are configured to:
provide, to the DU, an indication that the particular PHY profile is incompatible with a first front end unit profile.

3. The radio unit of claim 2, wherein the particular PHY profile is incompatible with the particular front end unit profile based at least in part on one or more of:
the particular PHY profile would cause input ports of one or more front end units to be open ports, or
the particular PHY profile would cause multiple component carriers configured for the one or more front end units to be connected to a single PHY partition subset.

4. The radio unit of claim 2, wherein the one or more processors are configured to:
provide, to the DU, an indication of one or more compatible pairs of PHY profiles and front end unit profiles that match the first front end unit profile.

5. The radio unit of claim 1, wherein the one or more processors are configured to:
provide a mapping of front end unit profiles to compatible PHY profiles.

6. The radio unit of claim 5, wherein the mapping of front end unit profiles to compatible PHY profiles comprises one or more of:
one or more validity indications,
a list of valid parings, or
a list of invalid pairings.

7. The radio unit of claim 5, wherein the mapping of front end unit profiles to compatible PHY profiles comprises one or more validity indications.

8. The radio unit of claim 5, wherein the mapping of front end unit profiles to compatible PHY profiles comprises a list of valid parings.

9. The radio unit of claim 5, wherein the mapping of front end unit profiles to compatible PHY profiles comprises a list of invalid pairings.

10. The radio unit of claim 1, wherein a PHY profile of the one or more candidate PHY profiles is associated with one or more of:
a PHY profile identification,
a number of partitions subsets supported in the PHY profile, or
for a partition subset supported in the PHY profile, one or more of:
a partition subset identifier,
a number of local baseband ports associated with the partition subset, or
global baseband port identifications for the local baseband ports associated with the partition subset.

11. The radio unit of claim 1, wherein a PHY profile of the one or more candidate PHY profiles is associated with a number of partitions subsets supported in the PHY profile.

12. A radio unit for wireless communication, comprising:
a memory; and
one or more processors coupled to the memory, wherein the one or more processors are configured to:
provide, to a distributed unit (DU), an indication of one or more candidate physical entity (PHY) profiles;
receive, from the DU, an indication of a particular PHY profile of the one or more candidate PHY profiles to use for communication with a device;
receive, from the DU, an indication of a set of parameters associated with one or more of: a candidate PHY profile or a candidate front end unit profile; and
provide, to the DU and based at least in part on the set of parameters, an indication of: one or more recommended PHY profiles of the one or more candidate PHY profiles, or one or more recommended front end unit profiles,
wherein reception of the indication of the particular PHY profile is based at least in part on the indication of the one or more recommended PHY profiles.

13. The radio unit of claim 12, wherein the set of parameters include one or more indications of:
a selection of a candidate PHY profile,
a selection of a candidate front end unit profile,
parameters associated with the particular PHY profile,
parameters associated with a first front end unit profile,
a number of component carriers to use for communication with the device, or
a set of proposed PHY profile and front end unit profile pairings.

14. The radio unit of claim 12, wherein, to provide the indication of one or more recommended PHY profiles, the one or more processors are configured to:
provide an indication of a set of PHY profiles that satisfy the set of parameters,
provide an indication of a set of PHY profiles that satisfy a subset of the set of parameters, or
provide an indication that the set of parameters is rejected.

15. The radio unit of claim 14, wherein the indication that the set of parameters is rejected comprises an indication of a reason for rejection of the set of parameters.

16. The radio unit of claim 12, wherein the set of parameters include a selection of a candidate PHY profile.

17. The radio unit of claim 12, wherein the set of parameters include a selection of a candidate front end unit profile.

18. The radio unit of claim 12, wherein the set of parameters include a selection of parameters associated with the particular PHY profile.

19. The radio unit of claim 12, wherein the set of parameters include a selection of parameters associated with a first front end unit profile.

20. The radio unit of claim 12, wherein the set of parameters include a selection of a number of component carriers to use for communication with the device.

21. The radio unit of claim 12, wherein the set of parameters include a selection of a set of proposed PHY profile and front end unit profile pairings.

22. The radio unit of claim 12, wherein, to provide the indication of one or more recommended PHY profiles, the one or more processors are configured to:
provide an indication of a set of PHY profiles that satisfy the set of parameters.

23. The radio unit of claim 12, wherein, to provide the indication of one or more recommended PHY profiles, the one or more processors are configured to:
provide an indication of a set of PHY profiles that satisfy a subset of the set of parameters.

24. The radio unit of claim 12, wherein, to provide the indication of one or more recommended PHY profiles, the one or more processors are configured to:
provide an indication that the set of parameters is rejected.

25. A radio unit for wireless communication, comprising:
a memory; and
one or more processors coupled to the memory, wherein the one or more processors are configured to:
provide, to a distributed unit (DU), an indication of one or more candidate physical entity (PHY) profiles;
receive, from the DU, an indication of a particular PHY profile of the one or more candidate PHY profiles to use for communication with a device;

receive, from the DU, a request for partition subset capabilities; and provide, to the DU, an indication of partition subset capabilities.

26. The radio unit of claim 25, wherein the partition subset capabilities are based at least in part on one of the one or more candidate PHY profiles or a front end unit profile.

27. The radio unit of claim 26, wherein, to provide the indication of partition subset capabilities, the one or more processors are configured to:

provide an indication of a dependency of the partition subset capabilities associated with the one of the one or more PHY profiles or the front end unit profile.

28. The radio unit of claim 27, wherein the indication of the dependency of the partition subset capabilities comprises one or more of:

an explicit indication of the dependency, or an invariant-based dependency.

29. The radio unit of claim 27, wherein the indication of the dependency of the partition subset capabilities comprises an explicit indication of the dependency.

30. The radio unit of claim 27, wherein the indication of the dependency of the partition subset capabilities comprises an invariant-based dependency.

* * * * *